United States Patent
Luscombe et al.

[11] Patent Number: 6,160,762
[45] Date of Patent: Dec. 12, 2000

[54] OPTICAL SENSOR

[75] Inventors: John Luscombe, Sugarland; Gary J. Craig; John L. Maida, Jr., both of Houston, all of Tex.; Louis W. Erath, Abbeville, La.; Malcolm Paul Varnham; Ed Kluth, both of Alresford, United Kingdom

[73] Assignee: Geosensor Corporation, Houston, Tex.

[21] Appl. No.: 09/098,918

[22] Filed: Jun. 17, 1998

[51] Int. Cl.[7] .................................................. H04R 1/02
[52] U.S. Cl. ........................ 367/149; 367/163; 73/1.85
[58] Field of Search ........................... 359/151; 367/149, 367/163, 174; 340/855.6; 702/54; 73/1.85, 1.45, 1.46

[56] References Cited

U.S. PATENT DOCUMENTS

| | | | |
|---|---|---|---|
| 4,268,116 | 5/1981 | Schmedel et al. | 359/151 |
| 4,458,343 | 7/1984 | Tehon et al. | 367/149 |
| 4,530,078 | 7/1985 | Lagakos et al. | 367/149 |
| 4,593,969 | 6/1986 | Goodman et al. | 359/151 |
| 4,959,539 | 9/1990 | Hofler et al. | 250/227.19 |
| 5,369,485 | 11/1994 | Hofler et al. | 356/345 |
| 5,381,492 | 1/1995 | Dooley et al. | 385/12 |
| 5,574,699 | 11/1996 | Cuomo | 367/149 |
| 5,625,605 | 4/1997 | Sullivan et al. | 367/149 |
| 6,049,511 | 4/2000 | Erath | 367/149 |

*Primary Examiner*—Nelson Moskowitz
*Attorney, Agent, or Firm*—Felsman, Bradley, Vaden, Gunter & Dillon, L.L.P.

[57] ABSTRACT

An element that is sensitive to a pressure or acceleration signal comprises an optical element capable of changing its index of refraction and/or path length in response to a time varying pressure or in response to acceleration and a pliant mounting member supporting the optical element. The mounting member changes its geometrical configuration in response to the time varying pressure or acceleration. Some embodiments of the invention use a mechanical amplifier to achieve the needed sensitivity.

20 Claims, 4 Drawing Sheets

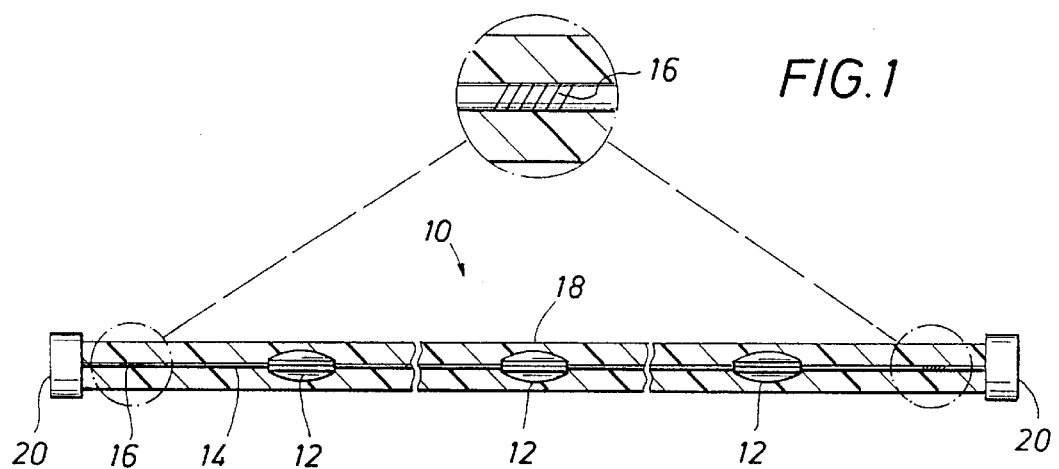
FIG.1
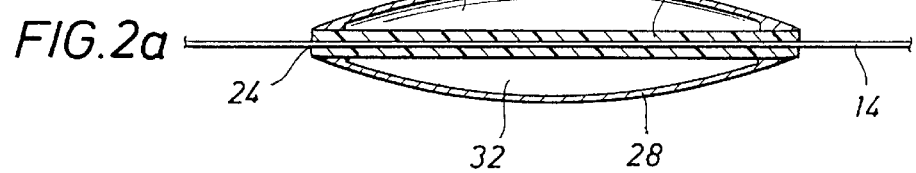
FIG.2a
FIG.2b
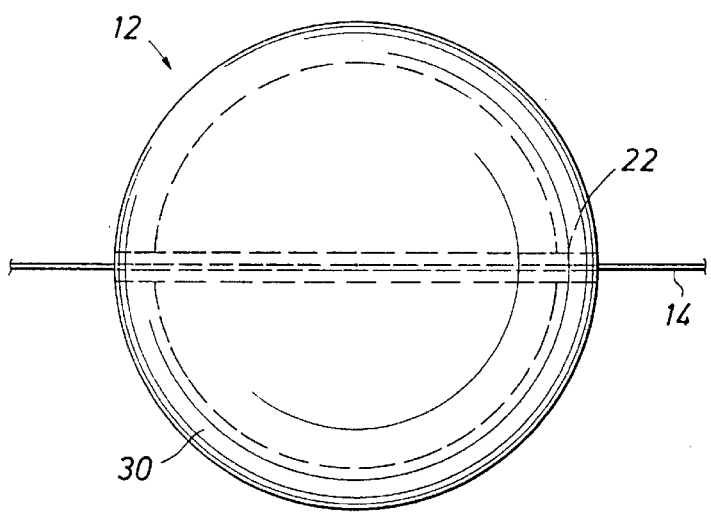
FIG.3
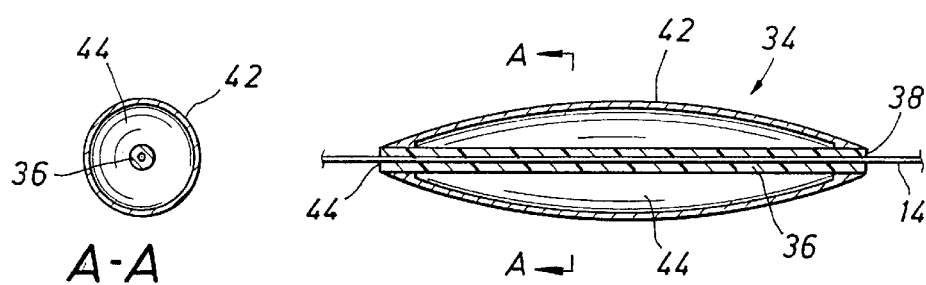

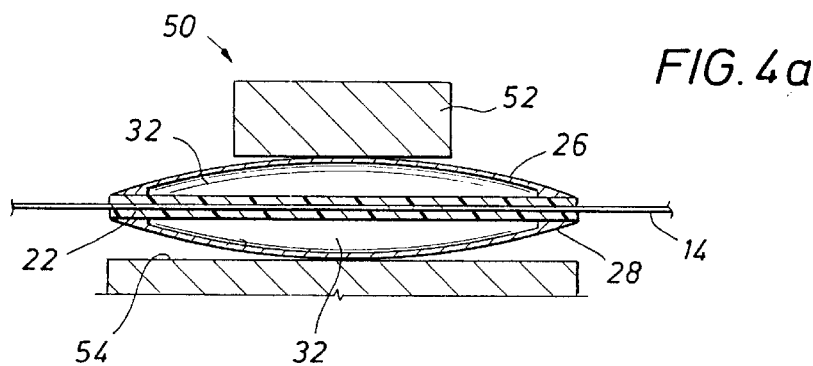
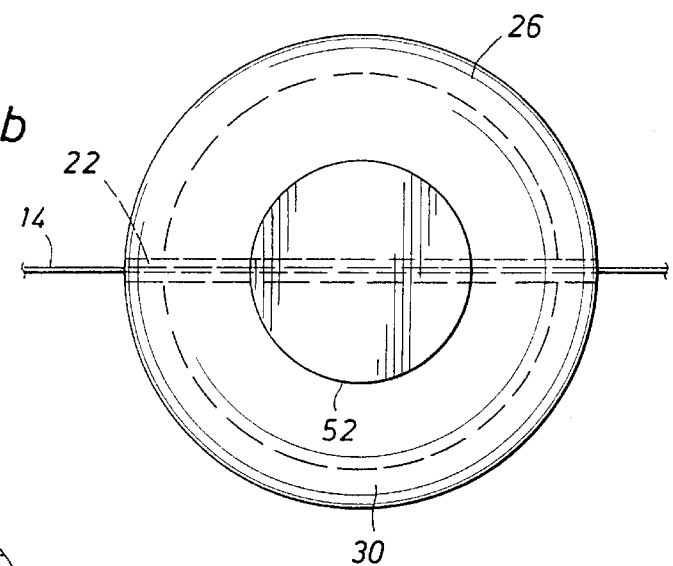
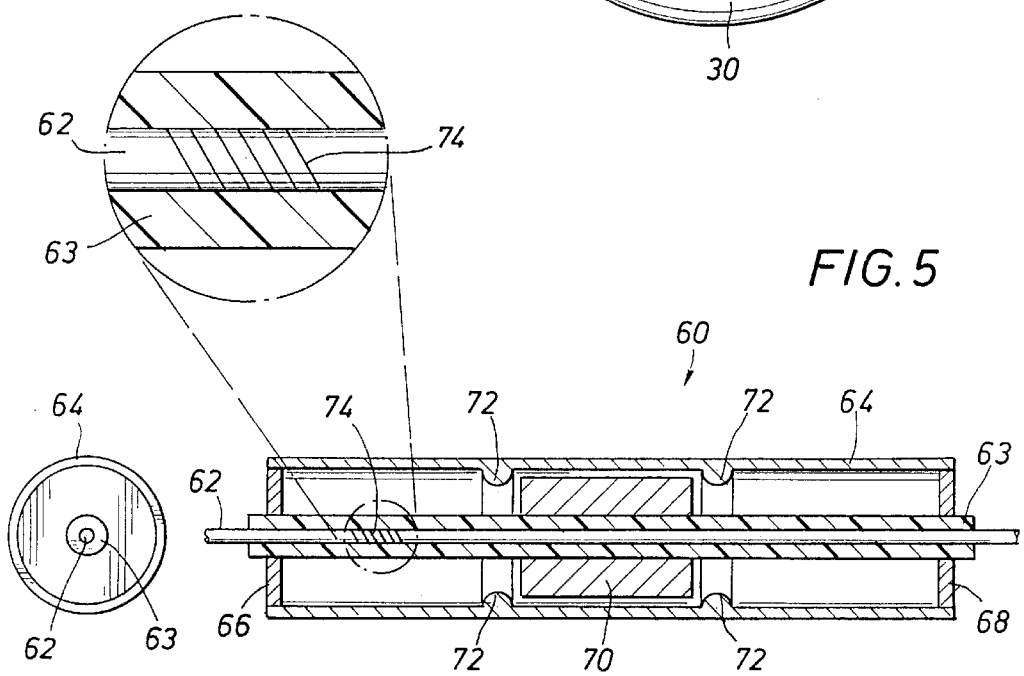

OPTICAL SENSOR

FIELD OF THE INVENTION

The present invention relates generally to the field of fiber optic sensing systems, and more particularly, to a sensor which generates a signal in response to a change in length of a fiber optic filament.

BACKGROUND OF THE INVENTION

The invention relates to a multiplexed optical fiber transducer array for use in seismic exploration equipment. A seismic signal may be either an acoustic signal or an acceleration signal, depending on the application. The transducer array is formed as a string of transducer assemblies threaded on a fiber without splicing. Fiber optic sensors that respond to variations in a selected field quantity such as pressure, acceleration, etc. have shown increasing promise for the acquisition of vast quantities of data, particularly in seismic exploration applications. Known means for measuring such variations include interferometers which detect changes, in optical phase and spectrometers which detect spectral shifts. For example, certain fiber optic interferometric sensors respond to underwater perturbations such as acoustic wave fronts by varying the effective length of the fiber optic filament in response to the perturbation.

In such applications, optical fibers are made sensitive to these physical phenomena, such as acoustic waves and acceleration. An optical fiber exposed to such phenomena changes the medium through which a light or infrared beam passes that is guided by the fiber. Optical fibers have been considered for use as sensing elements and devices such as microphones, hydrophones, magnetometers, accelerometers, and electric current sensors.

A hydrophone array or acoustic sensor array may be formed as an integral, self-contained linear array of hydrophones on a single cable. Commonly, such an array is made up of electromechanical transducer elements, principally piezoelectric devices, which generate electrical signals in response to pressure variations. These conventional sensors typically are active devices that require many electrical wires or cables. The sensors have the disadvantage of being susceptible to electrical noise and signal cross talk.

Fiber optic Mach-Zehnder and Michelson interferometers respond to the phenomena being sent by producing phase differences in interfering light waves guided by the optical fibers. Detecting phase changes in the waves permits quantitative measurements to be made on the physical quantity being monitored.

A fiber optic Mach-Zehnder interferometer typically has a reference arm comprising of first length of optical fiber and a sensing arm comprised of a second length of optical fiber. The sensing arm is exposed to the physical parameter to be measured, such as an acoustic wave front, while the reference arm is isolated from changes in the parameter. When the Mach-Zehnder interferometer is used as an acoustic sensor, acoustic wave fronts change the optical length of the sensing arm as a function of the acoustic wave pressure amplitude. An optical coupler divides a light signal between the two arms. The signals are recombined after they have propagated through the reference and sensing arms, and the phase difference of the signals is monitored. Since the signals in the reference and sensing arms have a definite phase relation when they were introduced into the arms, changes in the phase difference are indicative of changes in the physical parameter to which the sensing arm was exposed.

A Michelson interferometer also has a sensing arm and a reference arm that propagates sensing and reference signals, respectively. However, in the Michelson interferometer, these arms terminate in mirrors that cause the sensing and reference signals to traverse their respective optical paths twice before being combined to produce an interference pattern.

While effective in changing the effective optical path length of the optical fiber in response to the phenomenon to be measured, these known structures are relatively complex and relatively delicate, and therefore subject to a variety of modes of damage in the harsh environment in which they are deployed.

As an alternative to the interferometer, other systems use frequency modulation technique for the detection of the parameter to be measured. In both the interferometer and frequency modulation techniques, the fiber may be modified with a Bragg grating. Optical fiber Bragg gratings commonly take the form of a periodic modulation of the refractive index along a short length of the fiber. The grating reflects light of one wavelength which satisfies the Bragg condition that the wavelength is twice the periodicity of the grating. The periodicity is altered if the temperature or strain environment of the fiber is changed and therefore these parameters may be measured by monitoring the reflected wavelength.

Thus, there remains a need for a sensor that is responsive to variations in pressure, in the case of a hydrophone, or to acceleration, in the case of a geophone, using variations in the stress on a fiber optic element that is both robust and easily manufactured. In the case of a hydrophone, if the distance between Bragg gratings varies with the stress, then interferometric techniques may be used. On the other hand, stressing the fiber at the point of the Bragg grating actually stretches the grating itself and causes a variation in the frequency to which the Bragg grating responds. In that case, frequency modulation techniques are used to detect and measure the physical parameter of interest.

SUMMARY OF THE INVENTION

The present invention provides a cheap, robust, easy to manufacture system for and method of modulating the path length in an optical fiber acquisition system. The invention provides a means of converting measurands, such as pressure and acceleration, into path length variations of an optical fiber. Once the path length has been modulated in the optical fiber, one of several known acquisition systems may be used.

In one aspect of this invention, an element that is sensitive to a pressure or acceleration signal comprises an optical element capable of changing its refractive index and path length in response to a time varying pressure or in response to acceleration and a pliant tubular mounting member bonded to and supporting the optical element. The mounting member, also referred to as a stretcher tube, changes its geometrical configuration (i.e., length) in response to the time varying pressure or acceleration. Some embodiments of the invention use a mechanical amplifier to achieve the needed sensitivity.

It has been found that, if an optical fiber is grasped or secured at two points, in order to change the optical path between the two grasping points, the fiber is subject to damage or breakage. Rather than pull the fiber at the two points, the present invention provides a tube which itself changes in geometric configuration in response to the external stimulus and the tube supports the optical fiber therein.

In another aspect of this invention, means is provided for threadling assembled transducers on fibers. The fiber is threaded through and bonded to the stretcher tube, which has a spring constant selected to develop the desired response in the optical path length of the optical fiber. The stretcher tube may be made of a material such as neoprene rubber or other material to minimize creep. The tube includes a thin hole through which the optical fiber is inserted and then bonded. Thus, the support of the tube eliminates the failure mode wherein the optical fiber breaks between its points of support.

In another aspect of this invention, the pressure sensitive elements are threaded onto and bonded to the optical fiber in spaced-apart locations along the fiber. A pressure sensitive element may located at one of the periodic Bragg gratings so that, in the presence of a pressure signal, the Bragg grating itself is stretched thereby altering the frequency response of the Bragg grating. If the Bragg grating is positioned between pressure sensitive elements, then the pressure signal stretches the optical fiber, thereby altering the path length for the optical signal. Either configuration is provided by this invention.

In still another aspect of this invention, an optical fiber may be bonded within a tube of material exhibiting stretch characteristics the same as or different than that of the optical fiber. The tube, when subjected to a seismic signal, stretches the optical fiber, thereby changing the path length of light conducted within the fiber. The alteration of the optical path length is detected as a phase shift, thereby providing a measurement of the seismic signal.

These and other features of the present invention will be apparent to those of skill in the art from a review of the following detailed description along with the accompanying drawings.

BRIEF DESCRIPTION OF THE DRAWINGS

FIG. 1 depicts a seismic streamer incorporating the sensor element of this invention and further depicting a detail showing the locations of Bragg gratings.

FIG. 2a is a side view of a substantially disc-shaped sensor element of this invention in partial section, as used in a hydrophone application. FIG. 2b is a top view of the sensor element of FIG. 2a.

FIG. 3 is a side view of a substantially elongate sensor element of this invention and further depicting a detail showing the circular cross section of the sensor element.

FIG. 4a is a side view of a substantially disc-shaped acceleration sensor element using this invention. FIG. 4b is a top view of the acceleration sensor of FIG. 4a.

FIG. 5 is a side view of a cylindrical sensor element and depicting the location of a Bragg grating and further depicting a detail showing the circular cross section of the sensor element.

FIG. 8b is a top view of the sensor of FIG. 8a.

FIG. 9b is a top view of the sensor of FIG. 9a.

DETAILED DESCRIPTION OF A PREFERRED EMBODIMENT

Figure 6:
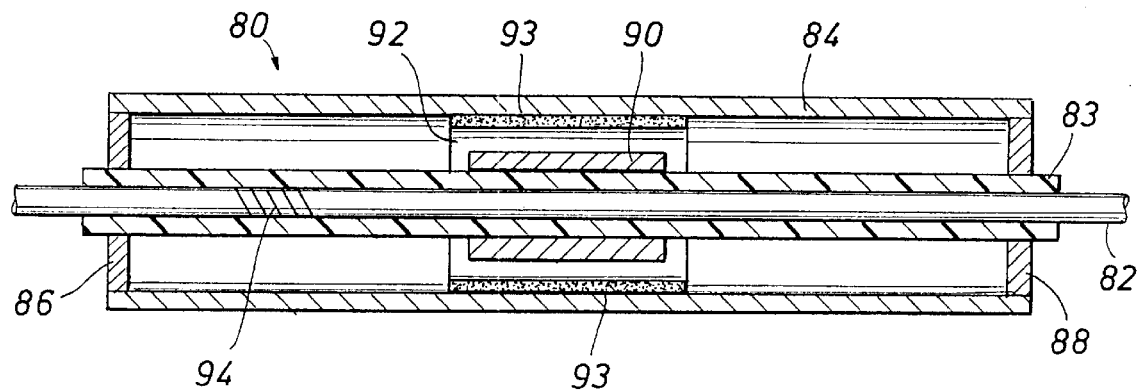
FIG. 6 is a side view of another preferred cylindrical sensor element.

FIG. 1 depicts a hydrophone streamer 10 which includes a number of sensor elements 12 of this invention. FIGS. 2 and 3 provide preferred structures of the sensor element 12. The streamer 10, in pertinent part, includes an optical fiber 14 on which the sensor elements 12 are mounted and bonded. Periodically along the optical fiber 14 are a plurality of Bragg gratings 16 formed in the optical fiber 14. The optical fiber with the sensors are installed in a flexible tube 18, such as by squirting the fiber and sensors into the tube, wherein the tube is filled with a liquid. Alternatively, the fiber and sensors may be formed into a solid streamer by extruding the assembly together. The tube and optical assembly terminates at each end in a connector 20 to connect additional sections of optical assembly.

FIG. 1 shows the Bragg gratings positioned at a location other than at one of the sensor elements 12. A sensor element may be positioned over a Bragg grating, meaning the Bragg grating is positioned somewhere within the sensor element. In the presence of a pressure signal, the sensor element stretches the length of optical fiber within the sensor element, thereby increasing the length of fiber between the Bragg gratings. This increase in length of the fiber causes a phase shift in the light with the fiber, and this phase shift is acquired as an acoustic signal for analysis and display in the conventional manner of interferometers. If instead the Bragg grating were located within a sensor element, a pressure signal stretches the optical fiber within the sensor element and therefore the Bragg grating, thereby modulating the frequency at which the Bragg grating responds. This frequency modulation may then be acquired as an acoustic signal for analysis and display by spectral analysis in the conventional manner.

FIGS. 2a and 2b provide a detailed view of a disc-shaped sensor element 12. The sensor element 12 includes an optical fiber 14 threaded on a tubular member 22. The tubular member 22 has a hole 24 therethrough that is slightly larger than the fiber 14 that passes through it. The fiber 14 is bonded by epoxy to the tubular member 22 during the process of assembling the streamer.

The tubular member 22 is clamped on top and bottom by an upper diaphragm 26 and a lower diaphragm 28. The upper and lower diaphragms are sealed together by a flange surface 30, forming a cavity 32 therebetween.

In operation, in the presence of a pressure signal, the upper and lower diaphragms are pressed together, exerting a tension stress on the tubular member 22 and this tension stress is passed along to the optical fiber 14, resulting in a physical alteration of the fiber which is detected as a phase or frequency shift and previously described.

While the structure of FIGS. 2a and 2b provides a relatively sensitive sensor element, this structure presents a certain challenge when trying to squirt the sensor and optical fiber into the tube 18 as described with regard to FIG. 1. As sensor 34 having the structure as shown in FIG. 3 overcomes this challenge.

The overall shape of the sensor 34 of FIG. 3 is an elongated oblate spheroid with truncated ends. An internal tube 36 defines a first end 38 and a second end 40. Attached at each of the ends 38 and 40 are the ends of a diaphragm member 42 of circular cross section, shown as section A—A in FIG. 3. The diaphragm 42 includes an air-filled void 44. The diaphragm amplifies and transmits an acoustic signal to the ends 38 and 40, thereby stretching the internal tube 36. This stretching of the internal tube 36 is translated to the fiber 14 within the internal tube. If a Bragg grating is included between the ends 38 and 40, then the Bragg grating is stretched also and frequency modulation techniques are used to acquire the acoustic signal. If the Bragg grating is included between the elements 34, then an interferometric technique is used.

FIGS. 4a and 4b show the structure of FIGS. 2a and 2b adapted to a geophone 50, and like elements, previously described, are provided with like numbers. Since a geophone is responsive to acceleration, rather than an acoustic signal, the structure further includes a mass 52 mounted on the upper diaphragm 26 and the structure is mounted on a base 54. As the geophone element 50 is moved, the mass 52 tends to exert a force on the upper diaphragm 26, which is translated to a stress force on the tubular member 22, thereby impressing a tension on the fiber 14 within the tube 22. This variation in the tension of fiber may then be used to effect the effective path length for the laser light within the fiber or stretch a Bragg grating, as appropriate and thereby provide a time varying signal in response to the acceleration.

It will be readily recognized by those of skill in the art that, rather than circular discs, the upper and lower diaphragms could be made rectangular, rather like a roof-top shape, and fall within the scope and spirit of this invention.

Figure 7:
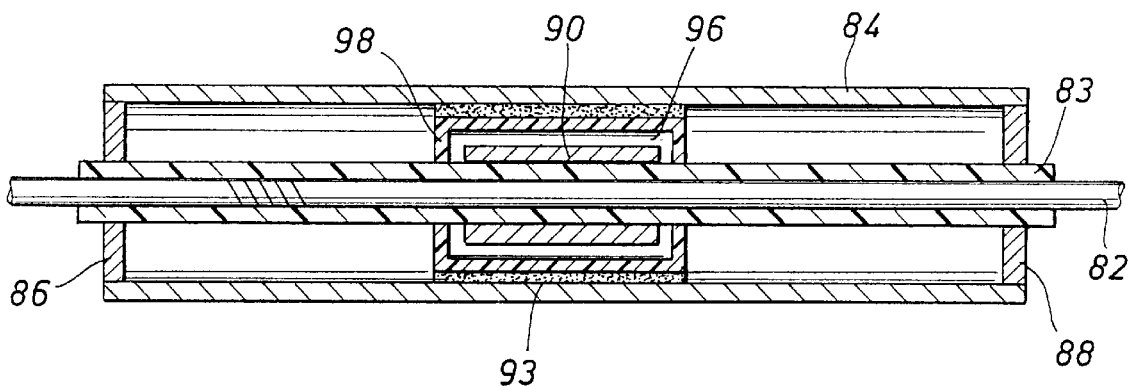
FIG. 7 is also a side view of another preferred cylindrical sensor element.

FIGS. 5, 6, and 7 depicts another preferred structure of a geophone which incorporates this invention. In FIG. 5, a sensor 60 includes an optical fiber 62 which is glued to a tubular member 63. The optical fiber 62 and tubular member 63 combination passes through and is secured to cylindrical chamber 64 which is enclosed by end walls 66 and 68. Also secured to the optical fiber 62 and tubular member 64 combination is a weight 70 which is permitted a limited amount of travel between a set of stops 72. Between the weight 70 and the end wall 66 is a Bragg grating 74, which is stretched and compressed by transverse movement of the weight, in response to an acceleration. Thus, the structure of the sensor of FIG. 5 (as well that the structure of the sensor of FIGS. 6 and 7) is applicable to a geophone that uses spectrum analysis acquisition techniques.

One drawback to the structure of the sensor of FIG. 5 is the fact that the weight 70 is suspended on the optical fiber between the end walls and will inevitably contact the surface of the cylinder. Under the influence of an acceleration, the weight will experience friction forces against the cylinder, thereby producing spurious signals. This drawback can be relatively easily solved by appropriate signal filtering and processing, or by either of the structures of FIGS. 6 and 7.

FIG. 6 depicts a variation of the structure of FIG. 5. A sensor 80 includes an optical fiber 82 which is glued to a tubular member 83. The optical fiber 82 and tubular member 83 combination passes through and is secured to cylindrical chamber 84 which is enclosed by end walls 86 and 88. Also secured to the optical fiber 82 and tubular member 84 combination is a weight 90 which is permitted a limited amount of travel by a flexible, polymeric mount 92. The mount 92 is glued or otherwise secured to the interior surface of the cylindrical chamber 84 by an epoxy 93. Between the weight 90 and the end wall 86 is a Bragg grating 94, which is stretched and compressed by transverse movement of the weight, in response to an acceleration. Thus, as previous mentioned, the structure of the sensor of FIG. 6 is applicable to a geophone that uses spectrum analysis acquisition techniques.

The structure of FIG. 7 is the same as that of FIG. 6 with the exception of the flexible mount. In FIG. 7, the flexible mount is a hollow flexible, polymeric shell 98 with an enclosed chamber 96 between the shell 98 and the weight 90. This structure permits greater travel of the weight 90 and the sensor is thus more sensitive and responsive to the stimulus of acceleration.

Figure 8A:
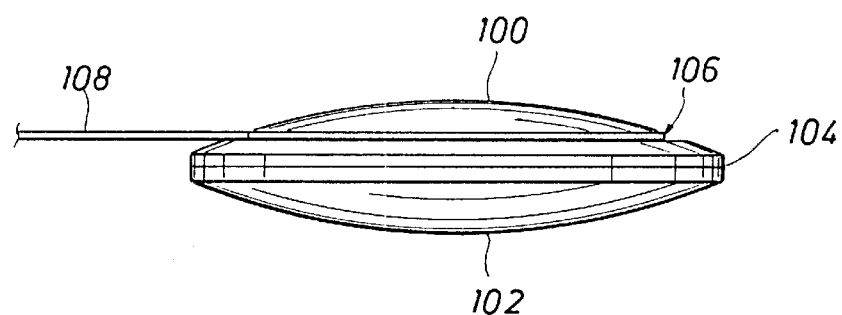
FIG. 8a is a side view of a substantially disc-shaped sensor element with a single turn of optical fiber wrapped around the perimeter of the disc.
Figure 8B:
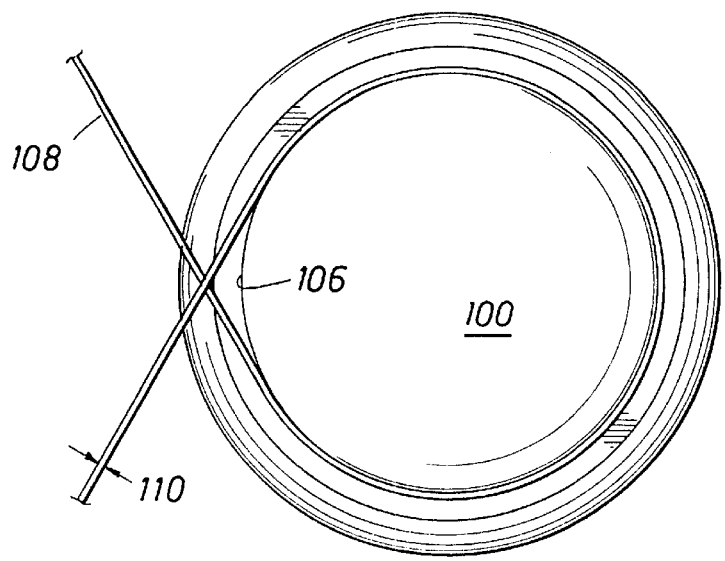

FIGS. 8a and 8b depict another aspect of the present invention that also eliminates the problem of grasping an optical fiber. The structure includes an upper disc half 100 and a lower disc half 102. The disc halves 100 and 102 are sealed together with a joining member 104, such as an epoxy. The upper disc half 100 includes a substantially vertical region 106, upon which a single wrap of optical fiber 108 may be wrapped. The optical fiber 108 may preferably be formed within a stretchable tube 110 as previously described.

In operation, a pressure signal impressed upon the upper and lower disc halves squeezes the halves together and extends the diameter of the disc assembly. This stretches the fiber 108, thereby lengthening the optical path for light within the fiber. This change in the optical path length is then detected as a phase shift for light within the fiber, indicative of the seismic signal.

Figure 9A:
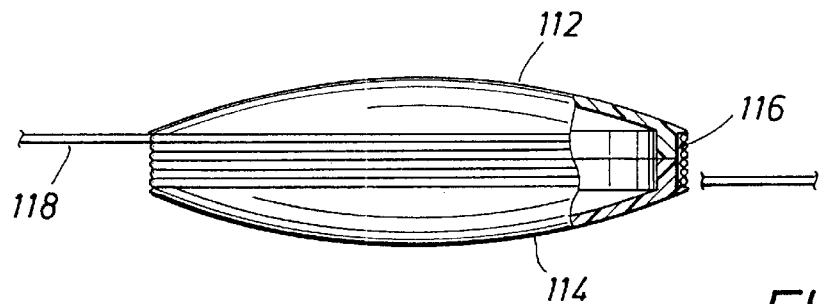
FIG. 9a is a side view of a substantially disc-shaped sensor element with multiple turns of optical fiber wrapped around the perimeter of the disc.
Figure 9B:
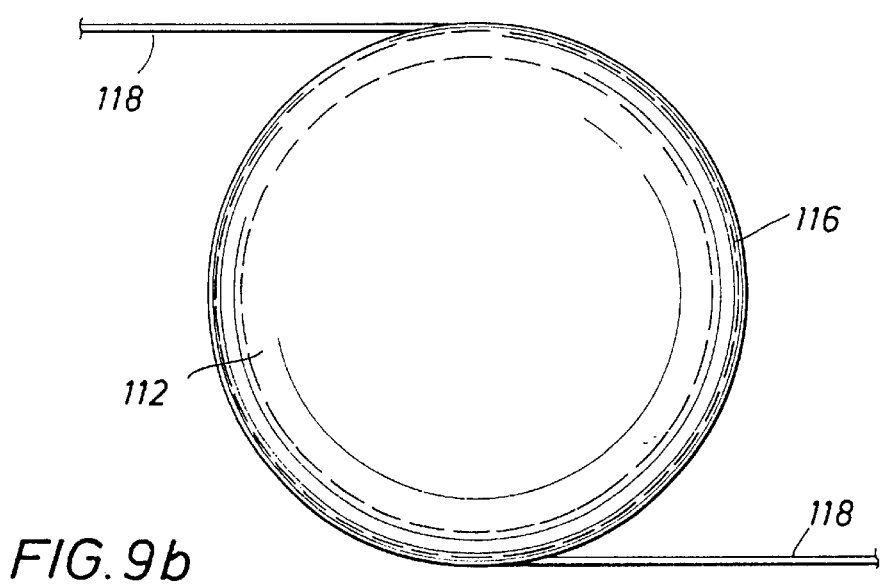

Similarly, FIGS. 9a and 9b depict a sensor comprising an upper disc half 112 and a lower disc half 114 joined by a vertical wall portion 116. In this embodiment, an optical fiber 118 is wrapped around the vertical wall portion 116 a plurality of times, as desired.

As with FIGS. 2a and 2b, as modified in FIGS. 4a and 4b, the embodiments depicted in FIGS. 8a, 8b, 9a, and 9b may be provided with a mass on the disc to adapt the structure as a geophone.

The forgoing has provided a detailed description of a sensor structure that is adaptable to either a hydrophone or a geophone, with appropriate modifications, and which is adaptable to either interferometric or frequency analysis acquisition techniques for the capture and display of the data of interest. This structure also provides a method of acquiring seismic data using the new structure. This structure further provides a method of making a seismic sensor, since the structure lends itself to the manufacture of a length of fiber optic seismic cable with no splices wherein a number of such sensors are threaded onto the optical fiber likes beads on a string into proper position where are then bonded to the optical fiber. The sensors may be positioned on either side of a Bragg grating within the optical fiber or a sensor may be positioned directly over a Bragg grating. The sensors need not be positioned relative to the Bragg grating with great precision because it is the macroscopic effect of the sensor, and the effect of the sensor on the effective length and refractive index of the optical fiber which is useful in such applications.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A sensor adapted to receive a seismic signal comprising:
   a. an optical fiber capable of changing length in response to the seismic signal;
   b. a pliant tube surrounding and supporting the fiber, the tube bonded to the fiber; and
   c. a convex, seismic signal sensitive member, the member coupled to the pliant tube at spaced apart points on the tube, wherein the member is subject to a geometrical configuration change in response to the seismic signal, thereby imparting a change in length of the tube in response to the seismic signal.

2. The sensor of claim 1 wherein the seismic signal is an acoustic signal.

3. The sensor of claim 1 wherein the seismic signal is an acceleration signal and further comprising a mass integral to the sensor to create the geometrical configuration change in the tube in response to the acceleration signal.

4. The sensor of claim 1, further comprising at least one Bragg grating in the optical fiber.

5. A seismic sensor array comprising:
 a. an optical fiber including a Bragg grating; and
 b. a plurality of seismic sensors bonded to the fiber, one of said plurality of seismic sensors bonded to the fiber over the Bragg grating.

6. The seismic sensor array of claim 5, wherein the seismic sensors are hydrophones.

7. The seismic sensor array of claim 5, wherein the seismic sensors are geophones.

8. A seismic sensor array comprising:
 a. an optical fiber including a Bragg grating; and
 b. a plurality of seismic sensors bonded to the fiber, said plurality of seismic sensors bonded to the fiber at a position other than the Bragg grating.

9. The seismic sensor array of claim 8, wherein the seismic sensors are hydrophones.

10. The seismic sensor array of claim 8, wherein the seismic sensors are geophones.

11. A hydrophone comprising:
 a. an optical fiber including a Bragg grating;
 b. a tubular member around and bonded to the optical fiber over the Bragg grating; and
 c. a hollow, disc-shaped chamber sealed to the tubular member so that the tubular member passes through the chamber.

12. A geophone comprising:
 a. an optical fiber including a Bragg grating;
 b. a tubular member around and bonded to the optical fiber over the Bragg grating;
 c. a hollow, disc-shaped chamber sealed to the tubular member so that the tubular member passes through the chamber;
 d. a mass secured to the chamber; and
 e. a base to support the chamber.

13. A hydrophone comprising:
 a. an optical fiber including a Bragg grating;
 b. a tubular member around and bonded to the optical fiber over the Bragg grating;
 c. an elongated spheroidal chamber of circular cross-section, the chamber sealed to the tubular member so that the tubular member passes through the chamber.

14. A geophone comprising:
 a. an optical fiber;
 b. a tubular member bonded to and around the optical fiber;
 c. a cylindrical chamber having end walls bonded to the tubular member;
 d. a Bragg grating in the optical fiber between the end walls; and
 e. a movable weight within the chamber and bonded to the tubular member.

15. The geophone of claim 14, further comprising stops within the chamber to limited the travel of the weight.

16. The geophone of claim 14, further comprising a flexible mount supporting the weight within the chamber, wherein the mount is secured to the weight and to the chamber.

17. The geophone of claim 14, wherein the flexible mount defines a hollow flexible shell between the weight and the chamber.

18. A hydrophone comprising:
 a. an optical fiber;
 b . a hollow, disc-shaped chamber comprising:
  i. an upper disc half;
  ii. a lower disc half; and
  iii. a substantially vertical member between and sealed to the upper and lower disc halves; and
 c. wherein the optical fiber is wrapped around the vertical member.

19. The hydrophone of claim 18, wherein the optical fiber is wrapped around the vertical member a plurality of wraps.

20. The hydrophone of claim 18, further comprising a tubular member bonded to and around the optical fiber.

* * * * *